United States Patent [19]

Barth

[11] Patent Number: 4,766,296

[45] Date of Patent: Aug. 23, 1988

[54] ARTICLE CHECKOUT COUNTER AND SYSTEM

[75] Inventor: Hans Barth, Fort Lauderdale, Fla.

[73] Assignee: CheckRobot, Inc., Deerfield Beach, Fla.

[21] Appl. No.: 43,938

[22] Filed: Apr. 29, 1987

[51] Int. Cl.$^4$ .............................................. G06K 15/00
[52] U.S. Cl. ..................................... 235/383; 235/385
[58] Field of Search ................................. 235/383, 385

[56] References Cited

U.S. PATENT DOCUMENTS 4,676,343 6/1987 Humble ................................. 235/383

*Primary Examiner*—Harold I. Pitts
*Attorney, Agent, or Firm*—Robin, Blecker & Daley

[57] ABSTRACT

A system is provided for the checkout of articles selected for purchase by consumers, comprising a code reader for reading an identification code on such articles and generating an output signal indicative of such code reading, a conveyor unit for receiving and transporting the articles, first and second bagging areas served by the conveyor unit, a channeling member operable for placing the conveyor unit selectively in communication with one or the other of the bagging areas, and switches operable by the consumers for use of the system. A controller is responsive to the code reader output signals and the switches for operation of the channeling member. The switches are operable separately by first and second customers respectively at the completion of first customer usage of the conveyor units and prior to use of the conveyor unit by the second customer. A display unit is provided for communication with the customers and the controller directs the display unit to provide instructions to the customers with respect to usage of the switches.

12 Claims, 3 Drawing Sheets

ARTICLE CHECKOUT COUNTER AND SYSTEM

FIELD OF THE INVENTION

This invention relates generally to operator-unattended checkout of purchased articles in supermarkets and like facilities and pertains more particularly to improved checkout counters and systems.

BACKGROUND OF THE INVENTION

Copending patent application, Ser. No. 628,913, entitled "System for Security Processing of Retailed Articles", commonly-assigned herewith, sets forth systems and methods for safeguarding operator-unattended checkout of purchased articles in supermarkets and like facilities against customer fraud. That application, incorporated herein by this reference thereto, is commonly assigned herewith and employs, among other components, an entry conveyor and an exit conveyor. Articles selected for purchase are scanned for universal product code (UPC) identification and then placed on the entry corveyor. After comparison of a characteristic of the article, while on the entry conveyor, with a stored value of such characteristic retrieved from memory based on the sensed UPC identification, the article is transferred from the entry conveyor to the exit conveyor. Various security measures are provided to defeat customer fraud, such as the provision of a controlled security zone about the conveyors.

In one embodiment of the '913 application, plural sets of conveyors are provided, extending in parallel to adjacent, but separate bagging areas. The system electronics is provided in single embodiment, usable successively by customers. There is generally concurrent usage of the system at large, since one customer can be engaging in checkout while a preceding customer is in the process of bagging processed articles. Simplification and cost reduction is enabled based on the single system electronics, e. g., both customers use the same scanner, the same display unit, etc.

SUMMARY OF THE INVENTION

The present invention has as its primary object the provision of further simplification and cost reduction of security and checkout systems of the foregoing type.

In the attainment of the foregoing and other objects, the invention provides a system for the checkout of articles selected for purchase by consumers, such system comprising a code reader for reading the universal product code (UPC) of each selected article, a conveyor unit for receiving such selected articles, plural bagging areas served by the conveyor unit and a channeling member adapted to place the conveyor unit selectively in communication with one or the other of the bagging areas.

The system of the invention is adapted for use with the automated checkout system above discussed, wherein the conveyor unit includes first and second conveyors, respectively for receipt of scanned articles and for conveyance thereof to the bagging area then operative, the first conveyor delivering the article to the second conveyor.

First and second motors are associated with the first and second conveyors for driving same and the system includes a controller responsive to the code reader and various other input signals to selectively operate the first and second motors and the channeling member.

In a particularly preferred embodiment, one of the various input signals to the controller is a request for usage of the conveyor unit by a successive second customer, generated during usage of the conveyor unit and system by a first customer who has not yet bagged articles selected for purchase. A display unit is included for communication with the second customer to facilitate common usage of the conveyor unit, as will be more fully discussed below.

The foregoing and other objects and features of the invention will be further evident from the following detailed description of preferred embodiments thereof and from the drawings wherein like reference numerals identify like components and parts throughout.

DESCRIPTION OF PREFERRED EMBODIMENTS AND PRACTICES

As above noted, incorporating reference is made to the '913 patent application. Accordingly, various components of such security and checkout system are not shown herein but may be seen and understood from the referenced application.

Figure 1:
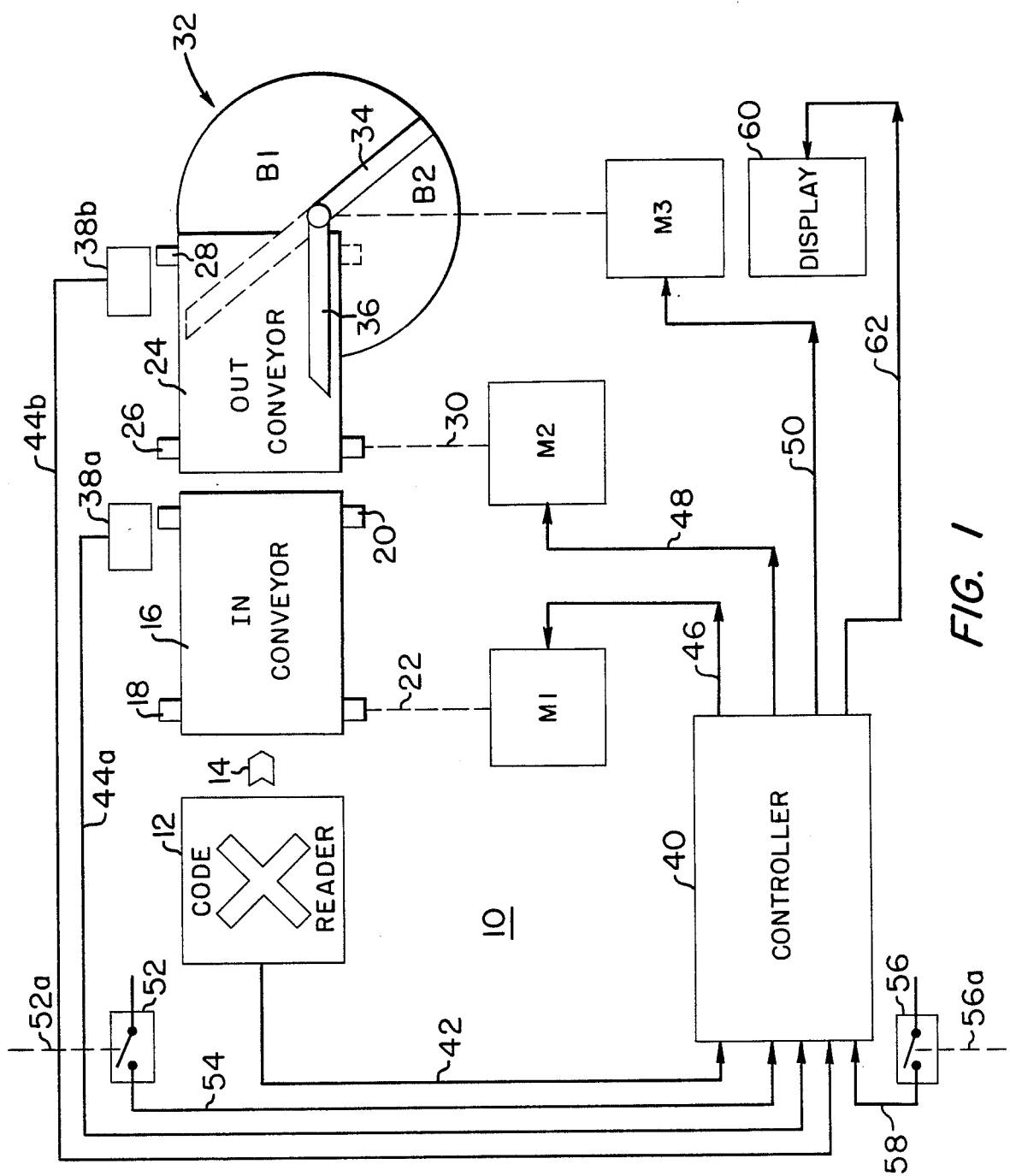
FIG. 1 is a schematic block diagram of a preferred embodiment of a system in accordance with the invention.

Referring to FIG. 1, system 10 of the invention includes a code reader 12 of the known type for providing an output signal indicative of its reading of the UPC cf an article thereby scanned, as by a customer passing the article UPC code legend thereover. Arrow 14 is intended to indicate that the customer places the article, after scanning, upon in or entry conveyor 16. Conveyor 16 is supported for movement by rollers 18 and 20, roller 18 being driven by motor M1 through mechanical linkage or shaft 22.

Out or exit conveyor 24 is in flow communication with in conveyor 16, forming therewith the aforementioned conveyor unit, and is supported for movement by rollers 26 and 28, roller 26 being driven by motor M2 through mechanical linkage 30.

Bagging area 32 is in flow communication with out conveyor 24 and is a rigid platform having dual bagging areas B1 and B2, separated by fixed divider 34. A movable channeling member 36 is secured to upright shaft 36a, which is rotatable by motor M3 through mechanical linkage 36b from its normal, biased solid line disposition in FIG. 1 to its phantom line disposition shown therein. The biasing of channeling member 36 into such normal disposition may be by spring-restraint of shaft 36a in counterclockwise sense against a suitable stop.

Sensing units 38a and 38b are provided, respectively adjacent the ends, or the entireties, of conveyors 16 and 24 and provide output signals indicative of whether articles are present or not present on such conveyors.

Controller 40, which is desirably a microcomputer programmed as below discussed, has a first input signal derived from line 42 and constituting advice that an article selected for purchase has been scanned. Controller 40 is further informed as to whether or not sensors 38a and 38b are cleared over lines 44a and 44b. Controller 40 provides output signals for selectively energizing motors M1, M2 and M3 over lines 46, 48 and 50.

A switch 52, of pushbutton, momentarily on variety, is operated through mechanical linkage 52a by a customer after placing the last of such customer's selected articles on conveyor 16. Controller 44 is so advised over line 54.

A desire for system usage by a second customer, while a first customer is using the system, is indicated by operation through linkage 56a of switch 56, also of momentary on type. Controller 40 is so advised over line 58.

Controller 40 provides output display signals to display unit 60 over line 62 for communication with customers, particularly as to the usage of switches 52 and 56.

Figure 2:
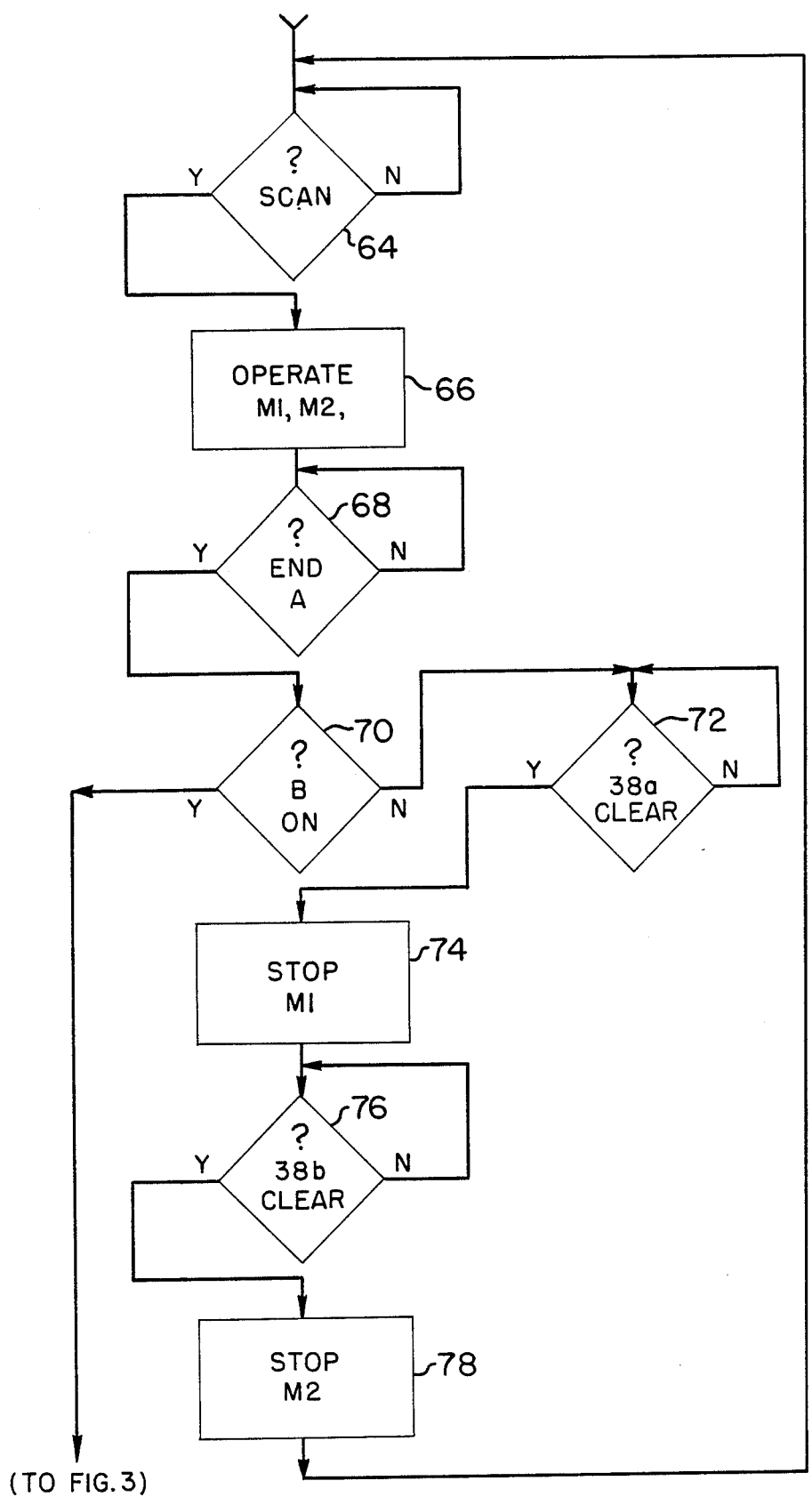
FIGS. 2 and 3 are flow charts indicative of the operation of the FIG. 1 system.
Figure 3:
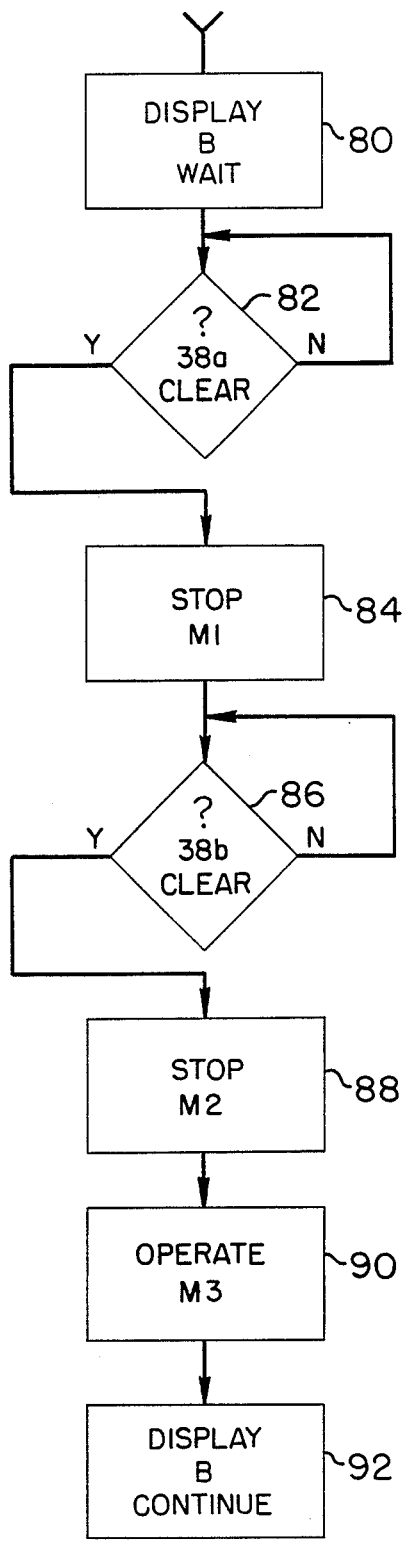

Operation and use of the system of FIG. 1 will be seen from the flow charts of FIGS. 2 and 3, which comprise a program which may be implemented by controller 40.

In step 64 (? SCAN), inquiry is made as to whether code reader 12 has scanned an article. If negative (N), the program cycles at this step. If positive (Y), step 66 (OPERATE M1, M2) is practiced, wherein controller 40 energizes motors M1 and M2 over lines 46 and 48 and both conveyors 16 and 24 are advanced. The system proceeds in this operation, with articles selected for purchase being successively scanned and placed on conveyor 16 being transported to bagging area B1. Throughout this time period, controller 40 monitors the state of switch 52 and the customer is instructed, through display 60, to operate switch 52 when the last selected article is scanned and placed on conveyor 16. Such monitoring occurs in step 68 (? END A), where A is intended as the first of two customers, the other being identified as B. The B customer is instructed by display 60 to operate switch 56 if the A customer is checking out articles and customer B is awaiting use of the system.

Controller 40 continuously monitors the state of switch 56 in step 70 (? B ON). Let us assume, for the present, that the inquiry to step 70 is negative, i.e., there is only one customer at hand. The program thus advances to step 72 (? 38a CLEAR) which inquires as to whether conveyor 16 is free of articles, which will be known from the state of sensor 38a. When the answer to this inquiry is positive, step 74 (STOP M1) is practiced and conveyor 16 is stopped. Inquiry is now made in step 76 (? 38b CLEAR) as to whether conveyor 24 is free of articles. When positive reply is made to this inquiry, motor M2 is deenergized in step 78 (STOP M2) and advance of conveyor 24 is discontinued and the program returns to step 64. In the course of such resetting, controller 40 clears its memory of the operation of switch 52. As is seen, in the single customer example, channeling member 36 remains quiescent and motor M3 is inactive.

Assuming now that customer B is present and in queue for use of the system, having operated switch 56 while customer A is checking out. Under this condition, the inquiry of step 70 above is now answered in the positive and the program branches to FIG. 3. Step 80 (DISPLAY B WAIT) is practiced, whereby customer B is instructed to await further instruction before using the system. Steps 82, 84, 86, and 88 are the same as steps 72, 74, 76 and 78 above and serve to track the completion of use of the system by customer A. Immediately upon positive inquiry to the step 86 inquiry, controller 40 calls for energization of motor M3 in step 90 (OPERATE M3). This moves channeling member 36 into its phantom line disposition in FIG. 1, blocking access to bagging area B1, which now contains all of the articles of customer A, and places conveyor 24 in communication with bagging area B2.

In step 90, contoller also resets the system by clearing its memory of the on states of switches 52 and 56. In step 92 (DISPLAY B CONTINUE), controller 40 instructs customer B to commence use of the system while customer A is then bagging articles at bagging area B1. The system operates now by considering customer B as it did customer A and repeats step 64 and the following steps of FIGS. 2 and 3.

If there is no queue during use of the system by such second customer, controller will deenergize motor M3 in resetting the system, whereupon channeling member 36 will return to its solid line FIG. 1 disposition. If a queue is at hand and channeling member is in its phantom line disposition, step 90 will now call for deenergization of motor M3.

In a second embodiment of the invention, controller 40 may implement a somewhat different program, wherein channeling member movement into disposition closing off the operative bagging area may be called for, irrespective of whether another customer is on queue or not. Motor M3 would thus be energized upon clearing of sensor 38b and operation of switch 52. A further sensor may be included in each of the bagging areas and, when the bagging area is clear of articles, motor M3 would be deenergized by the controller in such alternate program mode.

By way of summary and introduction to the ensuing claims, the invention will be seen to provide a system for the checkout of articles selected for purchase by consumers, such system comprising a code reader for reading an identification code on such articles and generating an output signal indicative of such code reading, a conveyor unit for receiving and transporting said articles, first and second bagging areas served by the conveyor unit, a channeling member operable for placing the conveyor unit selectively in communication with one or the other of the bagging areas, switches operable by the consumers for use of the system, and a controller responsive to the code reader output signals and the switches for operation of the channeling member. The switches are operable separately by first and second customers respectively at the completion of first customer usage of the conveyor units and prior to use of the conveyor unit by the second customer. A display unit is provided for communication with the customers and the controller directs the display unit to provide instructions to the customers with respect to usage of the switches.

A sensor is provided for detecting the presence of articles on at least the second conveyor and the controller is also responsive to such sensor in such operation of the channeling member. In the embodiment shown, the first bagging area has an entry portion thereof in alignment with the conveyor unit and the channeling member is movable from first disposition in alignment with the conveyor unit to second disposition in blocking relation to the first bagging area entry portion.

While channeling member 36 is shown in its preferred form, it could of course be supported on the upper side of conveyor 24 in FIG. 1 to be movable into alignment with member 34 to block off bagging area B1 and therefrom into alignment with the upper side of conveyor 24 to permit access to bagging area B1. In a still further embodiment, the channeling member may be elongated from its FIG. 1 length to permit a more acute angulation thereof with respect to the conveyor and lessen article drag, thereby to provide for a faster drive-off of articles into bagging area B2.

Various other changes to the depicted embodiment and modifications of the described practices may be introduced without departing from the invention. Accordingly, the particularly illustrated and discussed preferred embodiments are intended in an illustrative and not in a limiting sense. The true spirit and scope of the invention is set forth in the following claims.

What is claimed is:

1. A system for the checkout of articles selected for purchase by consumers, such system comprising a code reader for reading an identification code on such articles and generating an output signal indicative of such code reading, conveyor means for receiving and transporting said articles, first and second bagging areas served by the conveyor means, channeling means operable for placing said conveyor means selectively in communication with one or the other of said bagging areas, switch means operable by said consumers for use of said system, and controller means responsive to said code reader output signals and said switch means for operation of said channeling means.

2. The system claimed in claim 1 wherein said switch means comprises first and second switches operable separately by first and second customers respectively at the completion of first customer usage of said conveyor means and prior to use of said conveyor means.

3. The system claimed in 2 further including display means for communication with said customers, said controller directing said display means to provide instructions to said customers with respect to usage of said switches.

4. The system claimed in claim 1 further including sensing means for detecting the presence of articles on said conveyor means, said controller means further being responsive to said sensing means in such operation of said channeling means.

5. The system claimed in claim 4 wherein said conveyor means includes first and second conveyors in mutual communication, said sensing means including first and second sensors respectively adjacent said first and second conveyors.

6. The system claimed in claim 1 wherein said first bagging area has an entry portion thereof in alignment with said conveyor means, said channeling means comprising a member movable from first disposition in alignment with said conveyor means to second disposition in blocking relation to said first bagging area entry portion.

7. The system claimed in claim 1 wherein said controller means comprises first motive means for operating said conveyor means and second motive means for operating said channeling means.

8. The system claimed in claim 7 wherein said conveyor means includes first and second conveyors in mutual communication, said first motive means comprising separate motors respectively for operating said first and second conveyors.

9. A system for the checkout of articles selected for purchase by consumers, such system comprising a code reader for reading an identification code on such articles and generating an output signal indicative of such code reading, first and second conveyors in mutual communication for receiving and transporting said articles, first and second bagging areas served by said second conveyor, sensing means for detecting the presence of articles on at least said second conveyor, channeling means operable for placing said second conveyor selectively in communication with one or the other of said bagging areas, switch means operable by said consumers for use of said system, said switch means including first and second switches operable separately by first and second customers respectively at the completion of first customer usage of said conveyors and prior to use of said conveyor means and controller means responsive to said code reader output signals, said sensing means and said switch means for operation of said channeling means.

10. The system claimed in 9 further including display means for communication with said customers, said controller directing said display means to provide instructions to said customers with respect to usage of said switches.

11. The system claimed in claim 9 wherein said first bagging area has an entry portion thereof in alignment with said conveyor means, said channeling means comprising a member movable from first disposition in alignment with said conveyor means to second disposition in blocking relation to said first bagging area entry portion.

12. The system claimed in claim 9 wherein said controller means comprises individual motive means respectively for operation of said first conveyor, said second conveyor and said channeling means.

* * * * *